(12) United States Patent
Thiel

(10) Patent No.: US 7,771,155 B2
(45) Date of Patent: Aug. 10, 2010

(54) MULTI-LIFT FOR LIFTING AND STORING MOTORCYCLES AND OTHER VEHICLES

(75) Inventor: James Thiel, Benton, IL (US); Ron Shew, legal representative, Marion, IL (US)

(73) Assignee: Ron Shew Welding, Marion, IL (US)

( * ) Notice: Subject to any disclaimer, the term of this patent is extended or adjusted under 35 U.S.C. 154(b) by 331 days.

(21) Appl. No.: 11/901,979

(22) Filed: Sep. 20, 2007

(65) Prior Publication Data

US 2009/0196721 A1 Aug. 6, 2009

Related U.S. Application Data

(63) Continuation-in-part of application No. 11/322,101, filed on Dec. 29, 2005, now abandoned, which is a continuation of application No. 10/849,290, filed on May 19, 2004, now abandoned.

(60) Provisional application No. 60/471,441, filed on May 19, 2003.

(51) Int. Cl.
*H01L 21/687* (2006.01)

(52) U.S. Cl. .................. 414/672; 414/662; 414/668; 187/214; 187/271; 254/7 R; 254/13

(58) Field of Classification Search .......... 187/214, 187/271; 248/132, 240, 289.11, 290.1; 254/7 R, 254/89 H, 89 R, 92, 93 R; 269/60, 71; 414/228, 414/233, 240, 249, 427, 639, 662, 668, 672; 74/10.85, 25, 58

See application file for complete search history.

(56) References Cited

U.S. PATENT DOCUMENTS

| 783,699 | A | * | 2/1905 | Laffin | 248/132 |
| 1,539,761 | A | * | 5/1925 | Murray | 414/228 |
| 2,187,283 | A | * | 1/1940 | Scheutz | 414/672 |
| 2,593,635 | A | | 4/1952 | Walker | |
| 2,663,929 | A | | 12/1953 | Carpenter | |
| 2,742,164 | A | * | 4/1956 | Francis | 414/237 |
| 2,843,222 | A | | 7/1958 | Villars | |
| 3,021,104 | A | | 2/1962 | Keller | |
| 4,416,578 | A | * | 11/1983 | Behncke | 414/249 |
| 4,934,487 | A | * | 6/1990 | Isogai | 187/219 |

(Continued)

FOREIGN PATENT DOCUMENTS

JP          05-287923          11/1993

(Continued)

*Primary Examiner*—Gregory W Adams
(74) *Attorney, Agent, or Firm*—Paul M. Denk

(57) ABSTRACT

A multi-lift for lifting and storing motorcycles and other vehicles includes a column, incorporating a vertical threaded shaft therein. The shaft is capable of rotation in opposite directions through a reversing motor. The shaft has a threaded carriage mounted thereon, so that as the shaft rotates in one direction, the vehicle laden carriage may be elevated for storing a vehicle or the reversing motor may be turned in an opposite direction, for lowering a vehicle laden carriage, to provide for unloading a vehicle. The threaded carriage that mounts on the threaded shaft may hold one or more wheeled vehicles, and is telescopically constructed so as to extend its length, to allow for storing one or more vehicles lengthwise thereon.

4 Claims, 5 Drawing Sheets

U.S. PATENT DOCUMENTS

| | | | |
|---|---|---|---|
| 5,067,866 A * | 11/1991 | Fusaro et al. | 414/228 |
| 5,145,304 A | 9/1992 | Rosen | |
| 5,330,310 A | 7/1994 | Lin | |
| 5,702,222 A | 12/1997 | Rosen | |
| 2004/0247423 A1* | 12/2004 | Thiel et al. | 414/669 |
| 2006/0182564 A1* | 8/2006 | Thiel et al. | 414/427 |
| 2009/0196721 A1* | 8/2009 | Thiel | 414/427 |

FOREIGN PATENT DOCUMENTS

| | | |
|---|---|---|
| JP | 06-129129 | 5/1994 |
| JP | 06-173481 | 6/1994 |
| JP | 06-173482 | 6/1994 |
| JP | 06-193296 | 7/1994 |
| JP | 09-144368 | 6/1997 |

* cited by examiner

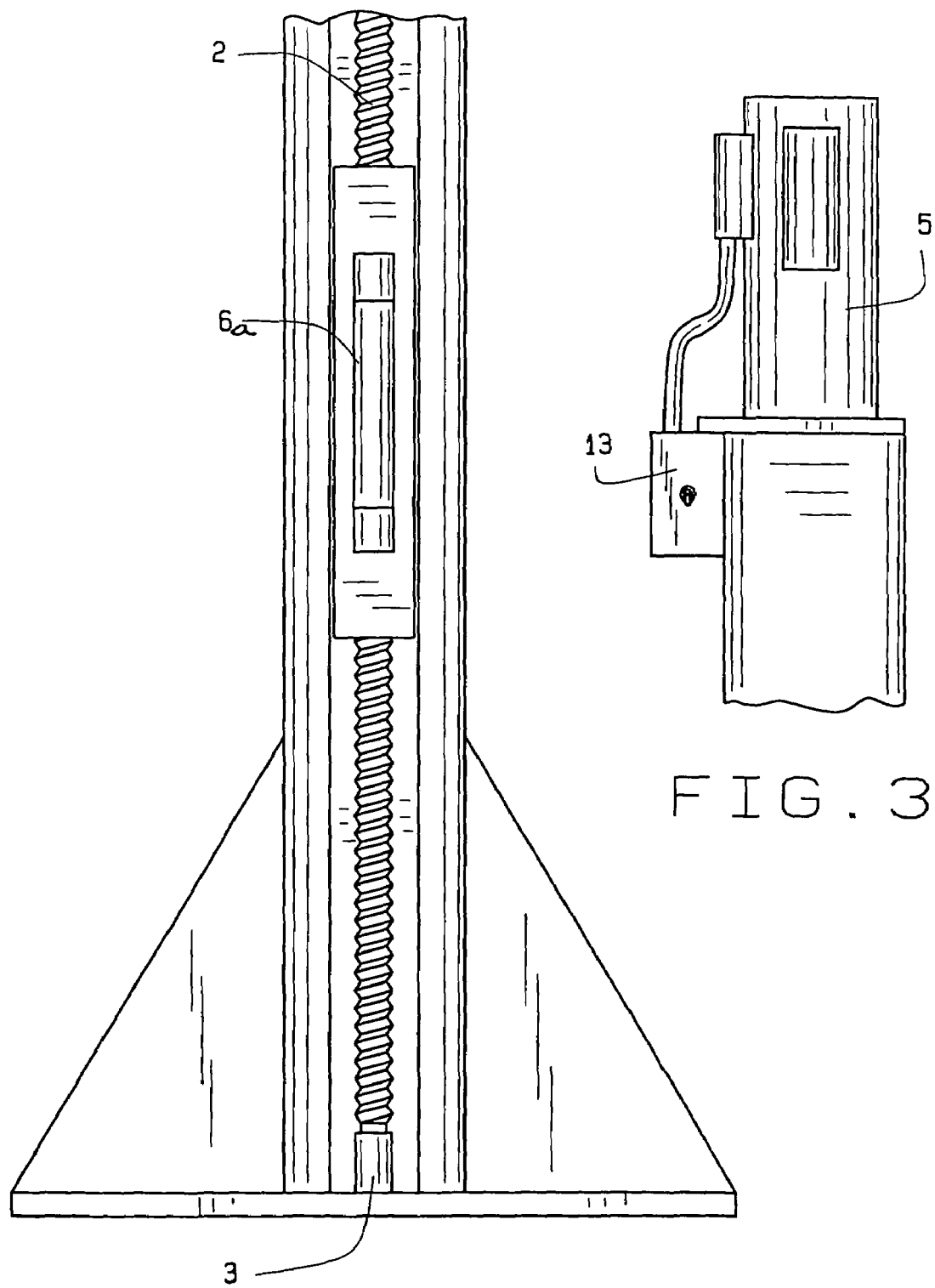

MULTI-LIFT FOR LIFTING AND STORING MOTORCYCLES AND OTHER VEHICLES

CROSS REFERENCE TO RELATED APPLICATION

This continuation-in-part patent application claims priority to the continuation application having Ser. No. 11/322,101, which was filed on Dec. 29, 2005, now abandoned which claims priority to the continuation application having Ser. No. 10/849,290, which was filed on May 19, 2004, now abandoned, which claims priority to the provisional application having Ser. No. 60/471,441, which was filed on May 19, 2003.

BACKGROUND OF THE INVENTION

This invention relates to generally to a lift mechanism, the principal of which can be used for lifting various types of vehicles, such as motorcycles, bicycles, and other vehicles, to elevate them, and provide additional storage room for such vehicles particularly during their period of non usage.

Various types of vehicle storage means have been provided in the art. As for example, the patent to Villars, U.S. Pat. No. 2,843,222, shows a lifting device. In this particular instance, the device appears to be used at a service station, for use for lifting an appliance, such as a motor car, or touring car, so that it can be serviced.

The patent to Rosen, U.S. Pat. No. 5,145,304, shows a height adjustable vehicle parking apparatus. This is a device that is used for storing and parking vehicles which includes a height adjustable means for supporting a vehicle boom, at various heights, to provide intermediate and upstanding stances that permit shifting of the vehicle once parked. It appears this device utilizes various types of hydraulic cylinders, and piston means, to elevate various vehicles.

The patent to Lin, U.S. Pat. No. 5,330,310, shows a double deck parking device. This device also can be used for providing multiple level parking for automobiles. It also appears to utilize various types of levers, with hydraulic cylinders, for lifting of the shown vehicle.

Another patent to Rosen, U.S. Pat. No. 5,702,222, shows an electrically driven car lift apparatus for home use. This device is also designed to provide for multi level parking, in the home and utilizes a chain drive, to elevate any vehicle.

Foreign patents mostly Japanese Publications describe other lifts. For example, Japanese patent No. 129,129 shows the use of a screw drive for elevating the vehicle and its platform. Japanese patent No. 173,481 shows another type of lifting device, which includes a pair of columns to raise a vehicle. Japanese patent No. 173,482 shows what appears to be a hydraulic type of lifting device for raising of its shown platform. The Japanese patent No. 193,296, describes another type of lift, which apparently operates upon a chain type drive. Japanese patent No. 144,368, shows some type of a multiple storage means for motorcycles, or the like. Finally, the Japanese patent No. 287,923 shows a type of lifting mechanism for elevating vehicles. This appears to operate off of a lever mechanism system for elevating its upper rack.

These are examples of prior art known to the applicant.

SUMMARY OF THE INVENTION

This invention contemplates the formation of stable supported column that it has a motor driven screw contained centrally therein. Within the central cavity of the column, a lift mechanism, this incorporates a threaded nut that rides up and down upon the screw, provides for the lift feature of this particular device. Externally of the lift mechanism there is a shaft upon a carriage to which the boom pivotally mounts. The boom has enough width to accommodate a motorcycle, or two, thereon, or perhaps other forms of bicycles, or cycles. When its motor is actuated, it allows for its screw to turn, elevating its threaded sleeve or nut, to raise the stored item thereon, such as a motorcycle, to an elevated position for storage.

In addition, the boom used for holding the motorcycles has sufficient width and stability to connect with the threaded nut, or sleeve that provided for its lift, upon turning of the screw. The boom telescopically mounts in its integral construction and also extends, so that perhaps more than one motorcycle may be mounted upon the boom, as it is elevated upwardly into storage. The boom, as it connects with its threaded sleeve, is pivotal, and can pivot approximately 60° to 90° with respect to its supporting column, so as to dispose the motorcycle laden boom generally angularly to the side, as it is elevated, to provide for overhead storage.

The device then provides a lifting and an aerial storage of motorcycles, especially. This device may also store and lift ATV's, lawn mowers, and other equipment. It is, therefore, the principal object of this invention to provide a pivoting boom upon which various types of vehicles and equipment may be temporarily mounted, such as a motorcycle, bicycle, or lawn mower, to provide for its elevating and storage.

Another object of this invention is to provide a boom or support assembly for a lift carriage which can slide outwardly, so as to provide adequate length for holding the entire motorcycle lengthwise, or perhaps more of the same, for overhead storage.

Another object of this invention is to provide a lift mechanism which can dispose its lifting boom directly on the floor, so that the motorcycle can be driven directly onto the carriage, and to make sure that the cycle is properly positioned, for elevation, as the lift mechanism is energized.

Still another object of this invention is to provide for a unique overhead storage system wherein the motorcycles, or other vehicles, can be adequately strapped into a stationary position, in preparation for their overhead storage.

Another object of this invention is to provide a lift mechanism that can hold a plurality of motorcycles in a storage position, through the use of multiple booms for supporting one or more motorcycles at various elevations throughout the height of the mechanism.

These and other objects may become more apparent to those skilled in the art upon reviewing the summary of the invention as provided therein, and upon undertaking a study of the description of its preferred embodiment, in view of the drawings.

BRIEF DESCRIPTION OF THE DRAWINGS

In referring to the drawings.

FIG. 2 is a front view of the lower section of the multi-lift device;

FIG. 3 is a side view of the upper section and motor of the multi-lift device;

The same reference numerals refer to the same parts throughout the various figures.

DESCRIPTION OF THE PREFERRED EMBODIMENT

Figure 1:
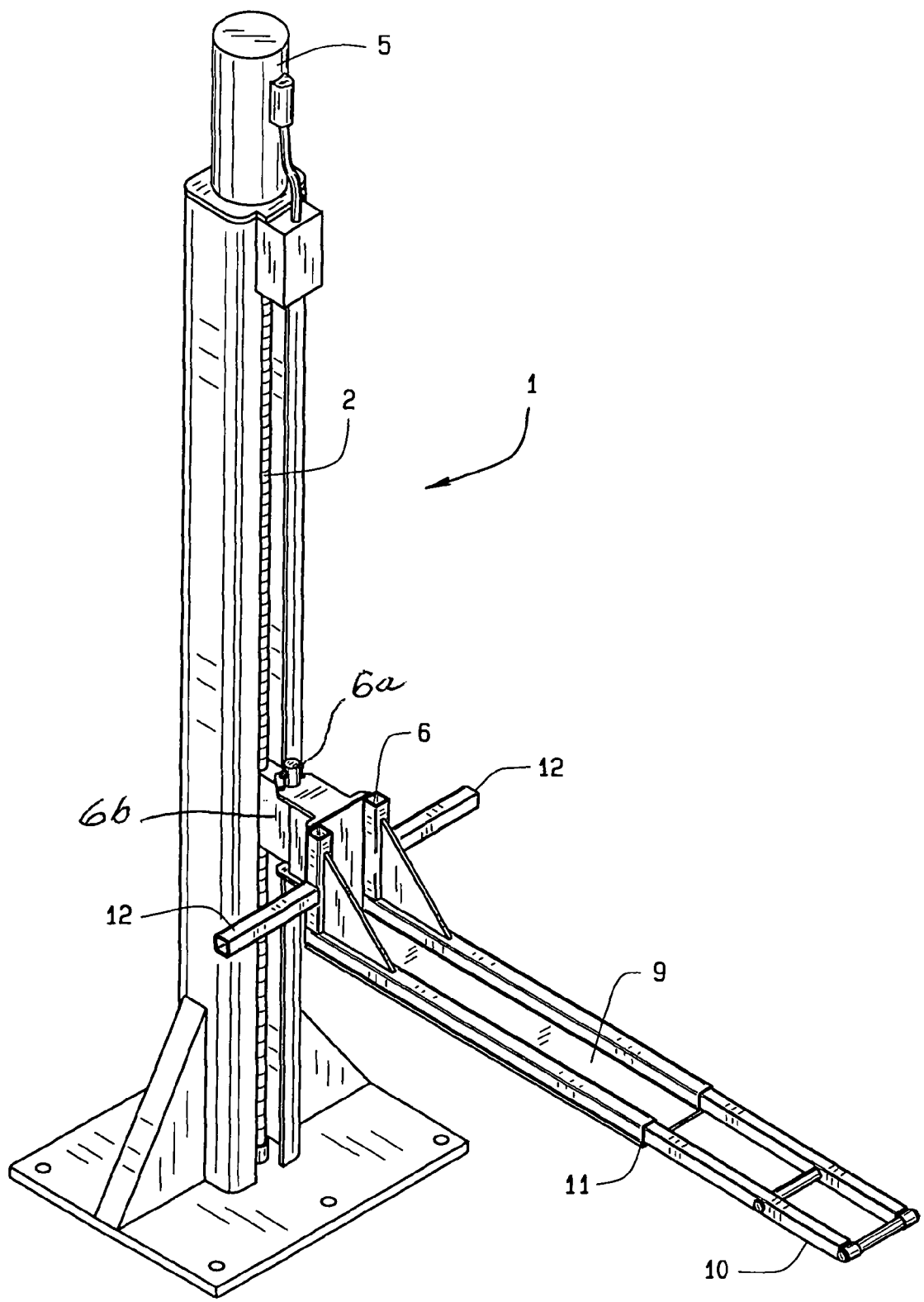
FIG. 1 is an isometric view of the preferred embodiment of the multi-lift device of the present invention.
Figure 4:
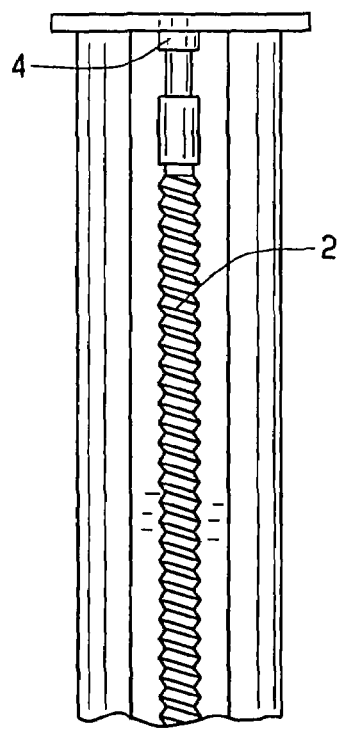
FIG. 4 is a front view of the shaft and the upper load bearing for the multi-lift device.

In referring to the drawings, and in particular FIG. 1, the multi-lift for lifting and storing motorcycles and other vehicles is disclosed at 1. This device, as shown, includes a column, which has located therein a threaded shaft or screw 2, supported therein by means of a lower bearing 3 (see FIG. 2) and an upper bearing 4 (see FIG. 4). The threaded shaft 2 is provided for pivoting or rotating within the column by means of a motor 5, which is generally connected, for turning the upper end of the threaded shaft 2 during operations of this device 1. The motor 5 is a reversible motor, which can be run in one direction for raising the carriage 6 and the boom 9, while it can be turned in an opposite direction for lowering of the carriage 6 and the boom 9. FIG. 3 also discloses the control box containing the electrical means for furnishing and controlling power to the motor 5. The control box being shown at 13.

In FIG. 1, the treaded sleeve or nut 6b is shown mounted upon its threaded shaft 2 of the screw drive. And, FIG. 2 also shows the connection of a pivot pin 6a, at the front of the threaded sleeve.

Figure 5:
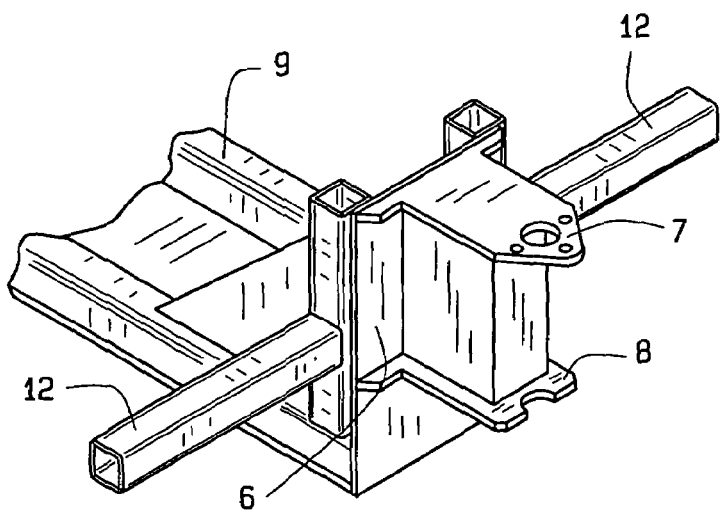
FIG. 5 is an isometric view of the carriage of this invention.

As shown in FIG. 5, the lift mechanism includes a carriage 6, which connects onto the threaded shaft 2 by means of an upper flange 7 and a lower flange 8 that ride upon the threads of the shaft 2 to provide for elevating or lowering of the entire carriage during its manipulation and operation. The upper flange 7 has a complete round hole to fit around the carriage while the lower flange 8 has a semicircular hole to merely ride upon the carriage 6. The semicircular hole allows for rapid installation and removal of the boom 9 from the carriage 6. As can further be seen, the carriage 6 includes a series of lateral handles, as at 12, in order to aid in the manipulation of the carriage 6, as pivoted, from one side to the other, as for use for storing motorcycles thereon.

Figure 6:
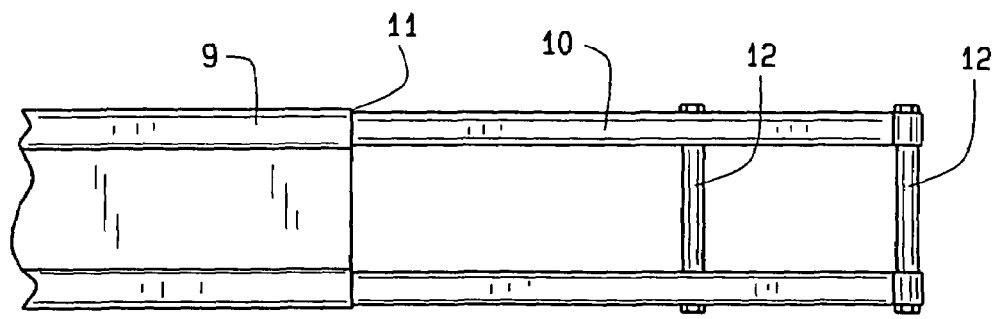
FIG. 6 is a view of the boom extended for holding one or more vehicles.

The boom 9 as can also be seen in FIG. 6 extends forwardly of the lift, and has a telescoping section 10, that telescopes and locates within the front part of the boom 9, as at 11. Thus, the boom 9 can be contracted by sliding the frontal part 10 into the main boom 9 at 11, or the boom 9 can be extended, as shown in FIG. 6, to hold one or perhaps two motorcycles thereon, during their support for storage. And while one or more motorcycles or other wheeled vehicles, can be located upon the carriage 6, and elevated to its fullest height, and then pivoted to one side, it is likely that an additional carriage 6 may be loaded onto the threaded shaft 2, so as to store multiple vehicles, thereon, during usage of this storage device 1.

In use, for example, one or more motorcycles could be located upon the carriage 6 and boom 9, as shown in FIG. 1, elevated, and then pivoted to the side, in the manner as shown in FIG. 1. Additional carriages 6 and booms 9 may be provided thereunder for simultaneous elevating by turning of the threaded shaft 2, after motorcycles have been applied thereto, to allow for their elevating, and pivoted to an opposite side or forwardly to furnish storage of a number of such vehicles. In addition, while the multi-lift of this invention is shown with indoor floor mounting, the present inventions can actually be located within a truck, on a truck bed, upon a trailer, and anywhere where storage is needed for a wheeled or other vehicle through the use of a multi-lift in a manner as shown and described herein.

Figure 7:
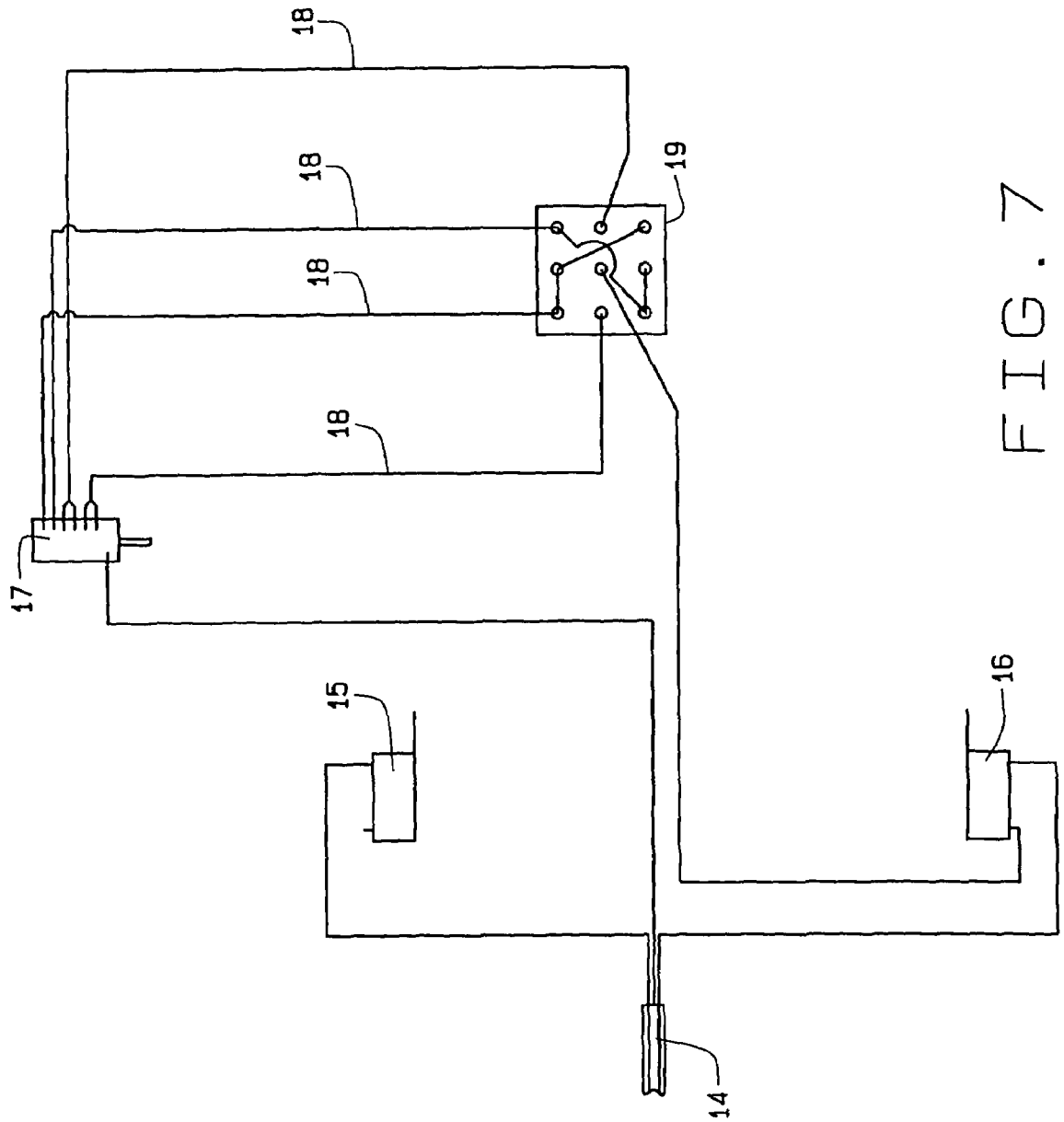
FIG. 7 is a schematic of the wiring diagram for controlling the electrical operations of this multi-lift device.

FIG. 7 discloses the wiring diagram for this particular invention and for furnishing the electrical charge necessary for it to function. For example, an incoming electrical line as at 14, delivers 110 volts AC to the system. Various limit switches are electrically connected, as can be seen at 15 and 16, as to furnish an upper limit to the extent upwardly that the carriage can be elevated while storing a vehicle, and to provide a lower limit to which the carriage may be lowered when receiving a vehicle. A motor 17 schematically shown in FIG. 7 is a reversible motor that can provide for turning the threaded shaft in one direction or the other, depending on whether the carriage is to be elevated, or lowered. Electrical lines, as can be noted at 18, provide for electrical connection between the motor 17, and the doubled throw double pull switch 19, which energizes the motor 5 in either forward or reverse turning. Thus, by manipulating the switch 19, the motor 5 can be energized by the incoming charge passing along electrical line 14, to either raise or lower the carriage 6.

Figure 8:
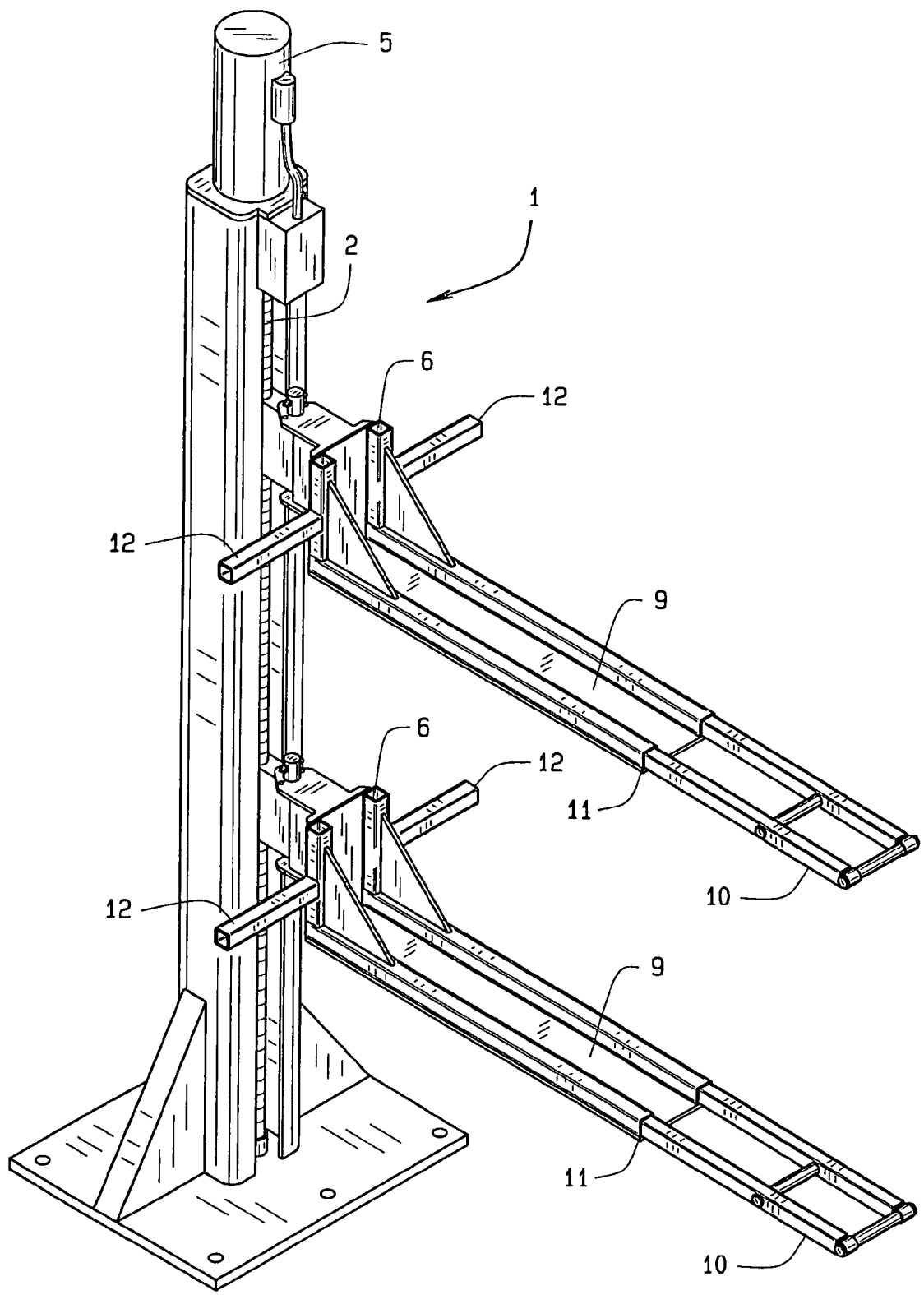
FIG. 8 is isometric view of the multi-lift device for holding a plurality of motorcycles vertically in a storage position.

As can also be noted in FIG. 8, therein is shown the multi-lift that can be used incorporating a plurality of the booms 9, mounting to their pivot pin 6a, as securing onto the threaded sleeve or nut 6b, as previously reviewed with respect to FIG. 1 embodiment. Thus, a plurality of the booms may be mounted onto the threaded shaft 2, motorcycles driven onto the boom, and as it is elevated, another threaded sleeve 6b may be applied, for additional motorcycles to be driven onto the multi-lift for storage of the motorcycles elevated thereupon. Obviously, such a device could extend all the way to the roof of a building, and many of such booms 9 can be applied, to provide for storage of many motorcycles, in place, during non-usage.

Variation or modifications to the subject matter of this invention may occur to those skilled in the art upon review of the invention as disclosed herein, such variations, if within the spirit of this development, are intended to be encompassed within the scope of the invention as shown and described. The description of the preferred invention and the depiction of the invention are for illustrative purposes only.

The invention claimed is:

1. A device for lifting a plurality of motorcycles having a column mounted upon a base and reinforced to said base, said column containing a vertical screw drive powered by a reversible electrical motor mounted upon said column opposite said base, wherein the improvement comprises:

a plurality of threaded sleeves;

each of said plurality of threaded sleeves threadedly mounted upon said screw drive and provided for vertical movement thereupon;

each of said plurality of threaded sleeves including a pivot provided thereon forwardly of said threaded mounting;

each of said plurality of threaded sleeves having pivotally mounted thereon a respective carriage;

a plurality of booms, each said boom being mounted to one of said respective carriages and generally extending perpendicular to said column, each said boom having an extension that linearly telescopes coaxially with said boom and away from said column, and each said boom capable of holding at least one motorcycle thereon in preparation for storage;

each said carriage having an upper flange having a complete hole that is round, a lower flange parallel to and mutually spaced apart from said upper flange having a semi circular hole coaxial with the complete hole, said upper flange applied upon said pivot and said lower flange resting against said pivot, whereby each said carriage is provided with limited lateral pivot relative to said column, whereby a motorcycle placed upon one of said plurality of booms, is positioned at a desired elevation through operations of said screw drive, and pivoted into a final location for storage, and said additional carriages and booms are applied to additional threaded sleeves upon said vertical screw drive to accommodate storage of other motorcycles there below.

2. The lifting device of claim 1 wherein said complete hole is round.

3. The lifting device of claim 1 and including one or more handles extending laterally from each carriage, and perpendicular to said column to facilitate pivot of each carriage and its boom and extension.

4. A device for lifting a plurality of motorcycles having a column mounted upon a base and reinforced to said base;

said column containing a vertical screw drive powered by a reversible electrical motor mounted upon said column opposite said base, wherein the improvement comprises at least one threaded sleeve threadedly mounted upon said screw drive and provided for vertical movement thereupon;

a pivot provided upon the at least one threaded sleeve forwardly of its mounted column;

a carriage pivotally mounted upon said at least one threaded sleeve through its mounting upon said pivot;

a boom being mounted to said carriage and generally extending perpendicular to said column, said boom having an extension that linearly telescopes coaxially with said boom and away from said column and capable of holding at least one motorcycle thereon in preparation for storage;

said carriage having an upper flange having a complete hole that is round, a lower flange parallel to and mutually spaced apart from said upper flange and having a semi-circular hole coaxial with the complete hole, said upper flange applied upon said pivot and said lower flange resting against said pivot, whereby said carriage is provided with limited lateral pivot relative to said column; and whereby a motorcycle placed upon said boom is positioned at a desired elevation, and pivoted into a final location for storage thereon.

* * * * *